(12) United States Patent
Allegri et al.

(10) Patent No.: US 8,984,979 B2
(45) Date of Patent: Mar. 24, 2015

(54) BALL SCREW ASSEMBLY WITH ONE-PIECE DEFLECTING ELEMENTS

(75) Inventors: Eric Allegri, Montmelian (FR);
Christophe Durand, Bassens (FR);
Jerome Dubus, La Riche (FR);
Romuald Lescorail, Saint Laurent en Gatines (FR)

(73) Assignee: Aktiebolaget SKF, Gothenburg (SE)

( * ) Notice: Subject to any disclaimer, the term of this patent is extended or adjusted under 35 U.S.C. 154(b) by 269 days.

(21) Appl. No.: 13/448,891

(22) Filed: Apr. 17, 2012

(65) Prior Publication Data
US 2012/0266702 A1    Oct. 25, 2012

(30) Foreign Application Priority Data
Apr. 19, 2011   (EP) .................................. 11305466

(51) Int. Cl.
*F16H 25/22*        (2006.01)
(52) U.S. Cl.
CPC ................................ *F16H 25/2214* (2013.01)
USPC .................................. 74/424.87; 74/424.82
(58) Field of Classification Search
USPC .............................. 74/424.82, 424.86, 424.87
See application file for complete search history.

(56) References Cited

U.S. PATENT DOCUMENTS

| 2,350,538 A | | 6/1944 | Selnes | |
|---|---|---|---|---|
| 3,512,426 A | | 5/1970 | Dabringhaus | |
| 3,592,072 A | | 7/1971 | Nilsson | |
| 4,357,838 A | * | 11/1982 | Blaurock et al. | ........... 74/424.87 |
| 6,112,610 A | * | 9/2000 | Welling | ........... 74/424.86 |
| 6,813,970 B2 | * | 11/2004 | Siler et al. | ........... 74/424.87 |
| 2010/0242651 A1 | * | 9/2010 | Shirai et al. | ........... 74/424.83 |

FOREIGN PATENT DOCUMENTS

| JP | 2007-78093 | * | 3/2007 |
|---|---|---|---|
| JP | 2008151244 A | | 7/2008 |
| JP | 2010190262 A | | 9/2010 |

* cited by examiner

*Primary Examiner* — William C Joyce
(74) *Attorney, Agent, or Firm* — Bryan Peckjian; SKF USA Inc. Patent Dept.

(57) ABSTRACT

Ball screw assembly comprising a screw (2) provided with an outer thread (3); a nut (4) provided with an inner thread (5); a series (6) of balls (7) able to circulate along a circulating path (10) between the screw and the nut, along which the balls are engaged in the threads thereof; and recirculating means (8) defining a recirculating channel (9) to carry balls from one end to the other end of said circulating path (10); The recirculating channel (9) comprising a return channel (14) provided on the nut and, between the ends of this return channel and the corresponding ends of said circulating path, deflecting channels (27, 28) which are defined respectively between surfaces (25) of deflecting elements (20, 21) engaged in respective holes (11, 12) of the nut (4) and local zones (26) of surfaces (16) of these respective holes.

15 Claims, 6 Drawing Sheets

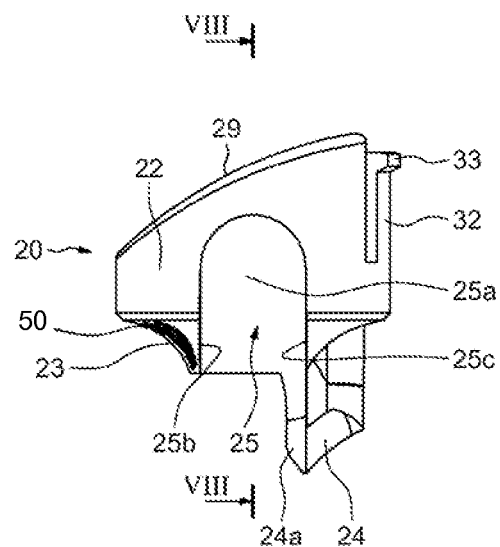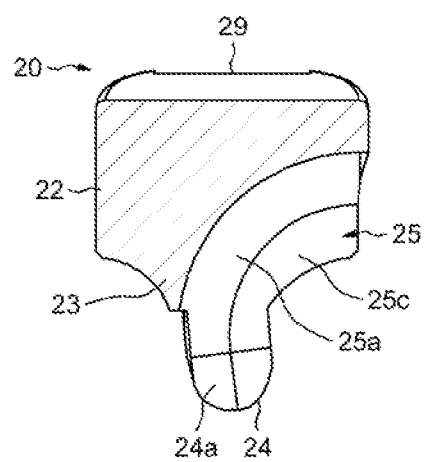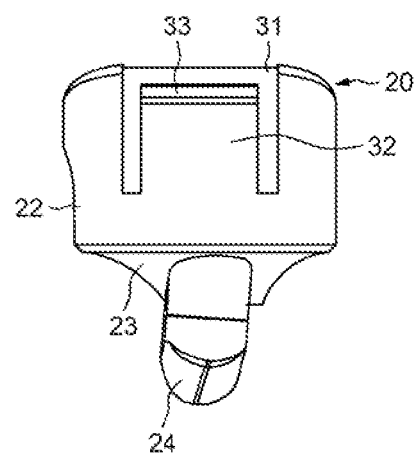

BALL SCREW ASSEMBLY WITH ONE-PIECE DEFLECTING ELEMENTS

CROSS-REFERENCE

This application claims priority to European Patent Application No. EP11305466.2 filed on Apr. 19, 2011, the contents of which are incorporated herein by reference as fully set forth herein.

FIELD OF THE INVENTION

The present invention relates to ball screw assemblies or devices able to be, for example, used to displace loads by transforming rotary action into linear motion.

BACKGROUND OF THE INVENTION

A ball screw assembly comprises generally a nut, a screw extending through the passage of the nut and a series of balls engaged into both the inner thread of the nut and the outer thread of the screw so as to provide a rolling engagement.

Patent application JP 2008-151244 describes a ball screw assembly comprising further a ball recirculating means comprising deflecting elements placed in radial holes of the nut and formed of two parts which define between them deflecting channels connected to a longitudinal hole of the nut, the parts of the deflecting elements being affixed one on the other through little screws.

This known device has numerous inconvenients and lead to unsatisfaction of users. It is necessary to manufacture separately the parts of the deflecting elements and to mount them one on the other and on the nut. The position of the parts of the deflecting elements one relative to the other and relative to the nut and the screw cannot be guarantee. So, it is difficult to obtain a good recirculation of the balls. Furthermore, production of noise cannot be reduced easily. This leads to a complex structure of the ball screw assembly as well as a high cost.

One aim of the present invention is to overcome at least some of those inconvenients.

SUMMARY OF THE INVENTION

In accordance with one embodiment of the invention, it is proposed a ball screw assembly comprising a screw provided with an outer thread; a nut provided with an inner thread; a series of balls able to circulate along a circulating path between the screw and the nut, along which the balls are engaged in the threads thereof; and recirculating means defining a recirculating channel to carry balls from one end to the other end of said circulating path.

The recirculating channel comprises a return channel provided on the nut and, between the ends of this return channel and the corresponding ends of said circulating path, deflecting channels which are defined respectively between surfaces of deflecting elements engaged in respective holes of the nut and local zones of surfaces of these respective holes.

The axis of the holes, which receive the deflecting elements, are placed in planes which are symmetrical with respect to a plane containing the axis of the nut.

The deflecting elements are of one-piece units and comprise respective pick-up and release lugs engaged between the threads of the screw and the nut.

Said surfaces of the deflecting elements and said local zones of surfaces of the holes can be connected to the return channel tangentially.

The return channel can comprise a main hole which extends parallel to the axis of the nut, the plane of symmetry of the holes, which receive the deflecting elements, containing the axis of the main hole.

The deflecting elements can comprise respective grooves forming said surfaces thereof.

The grooves of the deflecting elements can comprise curved half-circular bottom surfaces and opposed and parallel surfaces, the curved half-circular bottom surfaces facing said local zones of surfaces of the holes of the nut.

The holes of the nut receiving the deflecting elements can have at least respective convex toroidal surfaces comprising said local zones.

The holes of the nut receiving the deflecting elements can have successively, from the outside to the inside of the nut, cylindrical surfaces, respective convex toroidal surfaces and conical surfaces, the convex toroidal surfaces and the conical surfaces defining said local zones.

The deflecting elements can have profiles corresponding to the profiles of the respective holes of the nut.

The assembly can comprise angular indexing means of the deflecting elements in the respective holes of the nut.

The indexing means can comprise recesses in the holes and parts of the lugs of the deflecting elements engaged in these recesses.

The deflecting elements can comprise respective pick-up and release lugs engaged between the threads of the screw and the nut.

Means for fixing the deflecting elements in the repective holes of the nut can be provided.

The fixing means can comprise parts of the nut and the deflecting elements engaging each other.

Said parts of the nut can be cavities formed in the holes thereof and said parts of the deflecting element can be flexible legs having projections engaged in said respective cavities.

The fixing means can comprise glue.

The return channel can comprise a hole extending longitudinally into the nut.

It is also proposed a linear actuator comprising a motor and a ball screw assembly, the screw of said assembly being connected to said motor.

BRIEF DESCRIPTION OF THE DRAWINGS

A ball screw assembly or device providing with ball recirculating means, according to the present invention and applications will now be described by way of a non-limiting example illustrated by the appending drawing, on which:

FIG. 7 is an external view of a deflecting element, on the side of its groove;

FIG. 8 is a cross section of the deflecting element on VIII-VIII of FIG. 7;

FIG. 9 is another external view of the deflecting element of FIG. 7;

DETAILED DESCRIPTION OF THE PREFERRED EMBODIMENTS

Figure 1:
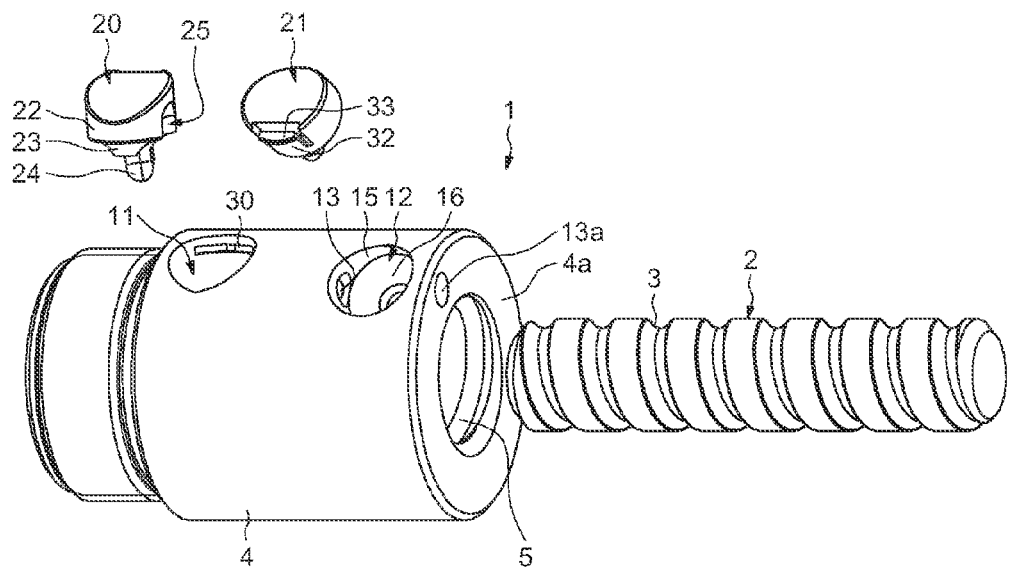
FIG. 1 is a partial exploded perspective view of a ball screw assembly according to the invention, without the balls.
Figure 2:
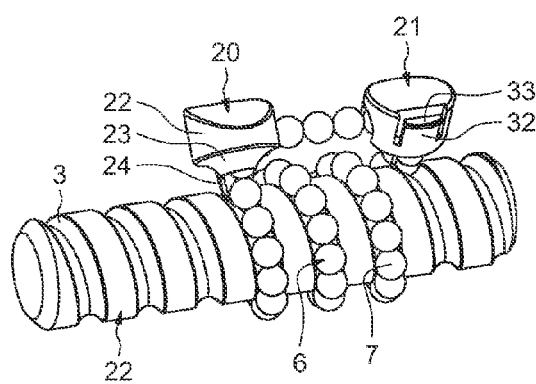
FIG. 2 is another partial exploded perspective view of the assembly of FIG. 1, with the balls.

As illustrated on FIGS. 1 to 4, a ball screw assembly or device 1 comprises a threaded screw 2 having an outer thread 3, a substantially cylindrical threaded nut 4 having an inner thread 5 whose internal diameter is slightly larger than the external diameter of the thread 3 of the screw 2, a series 6 of spherical balls 7 for connecting the screw 2 to the nut 4, and ball recirculating means 8 carried by the nut 4 and defining a recirculating channel 9.

The series 6 of spherical balls 7 is such that some balls are respectively engaged, radially, partly in the thread 3 of the threaded screw 2 and partly in the thread 5 of the nut 4, along a circulating path 10 of the nut 4 which can be formed along one or several spires of the thread 5 of the nut 4, while some other balls are in the recirculating channel 9.

A rotation of the threaded screw 2 and the nut 4 with respect to each other is transformed into a longitudinal linear movement with respect to each other because the balls 7 of the series 6 of balls roll along the threads 3 and 5 by following the circulating path 10 and run freely along the recirculating channel 9 from one end to the other end of the circulating path 10.

The recirculating means 8 defining the recirculating channel 9 are accommodated as following.

Figure 3:
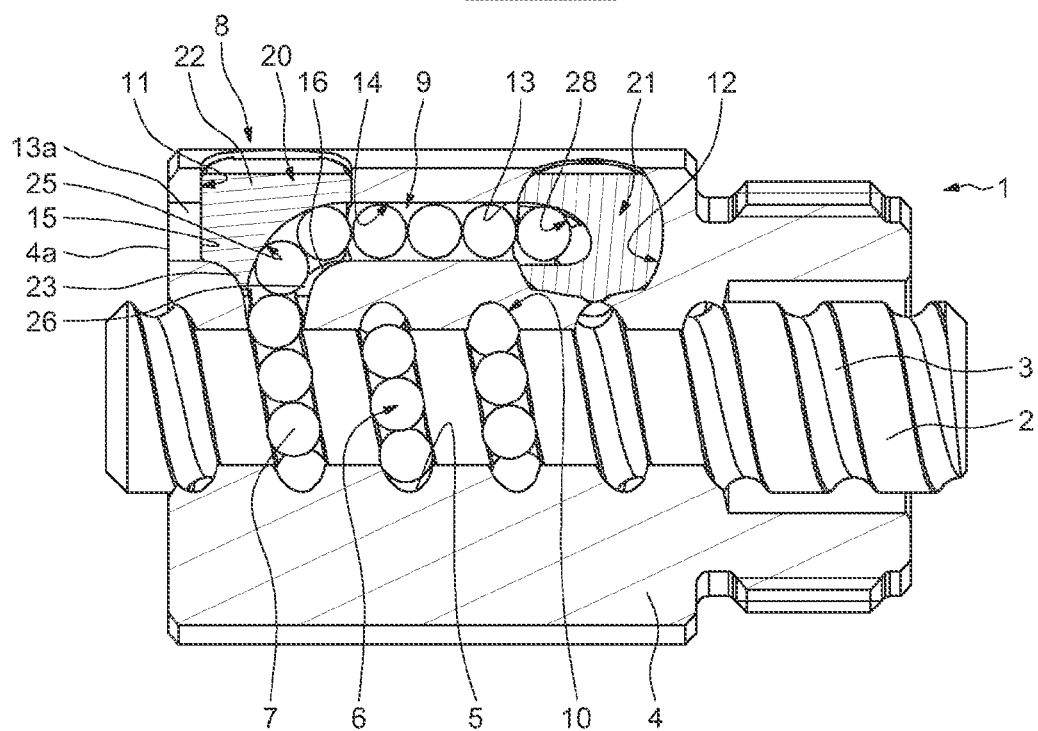
FIG. 3 is a longitudinal section of the assembly on III-III of FIG. 5, containing the axis of a deflecting element, with the balls.

The wall of the nut 4 is provided with two secondary stepped holes 11 and 12 transversing the thickness thereof and spaced apart longitudinally to the nut 4 and is providing with a longitudinal cylindrical main hole 13 made parallelly to the axis of the nut 4 and joining the secondary holes 11 and 12. The longitudinal main hole 13 can be formed by a longitudinal portion of a longitudinal hole 13*a* formed from a radial face 4*a* of the nut 4 (FIG. 3). The longitudinal main hole 13 has a diameter slightly superior to the diameter of the balls 7 and defines a return channel 14.

Figure 6:
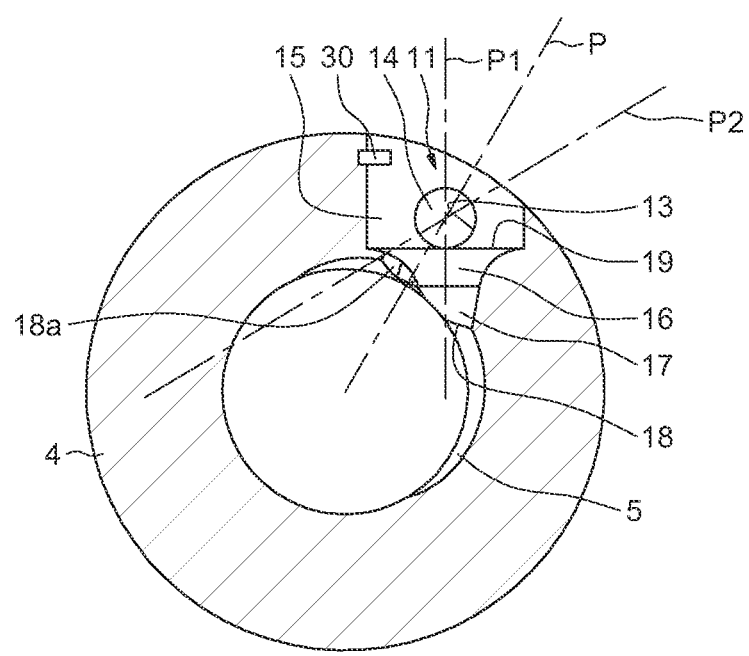
FIG. 6 is a cross section of the nut of the assembly, only, corresponding to FIG. 5.

A illustrated more particularly on FIG. 6, the secondary holes 11 and 12 are stepped and comprise respectively, from the outer to the inner of the wall of the nut 4 and successively, an cylindrical surface 15 having a diameter greater than the diameter of the secondary longitudinal hole 11, an intermediate convex toroidal surface 16 and a tronconic surface 17 which defines an inner opening 18 which is opened in a respective zone of the inner thread 5 of the nut 4. The sections of the intermediate convex toroidal surface 16 and the tronconic surface 17 reduce from the cylindrical surface 15 to the inner opening 18.

As more particularly illustrated on FIG. 6, the axis of the secondary holes 11 and 12 are placed in respective planes P1 and P2 which contain the axis of the longitudinal main hole 13 and which are oriented symetrically with respect to a plane P containing the axis of the screw 2 or the nut 4 and the axis of the longitunal main hole 13 and in order to extend substantially tangential to the location of the thread 3 of the screw 2.

Figure 4:
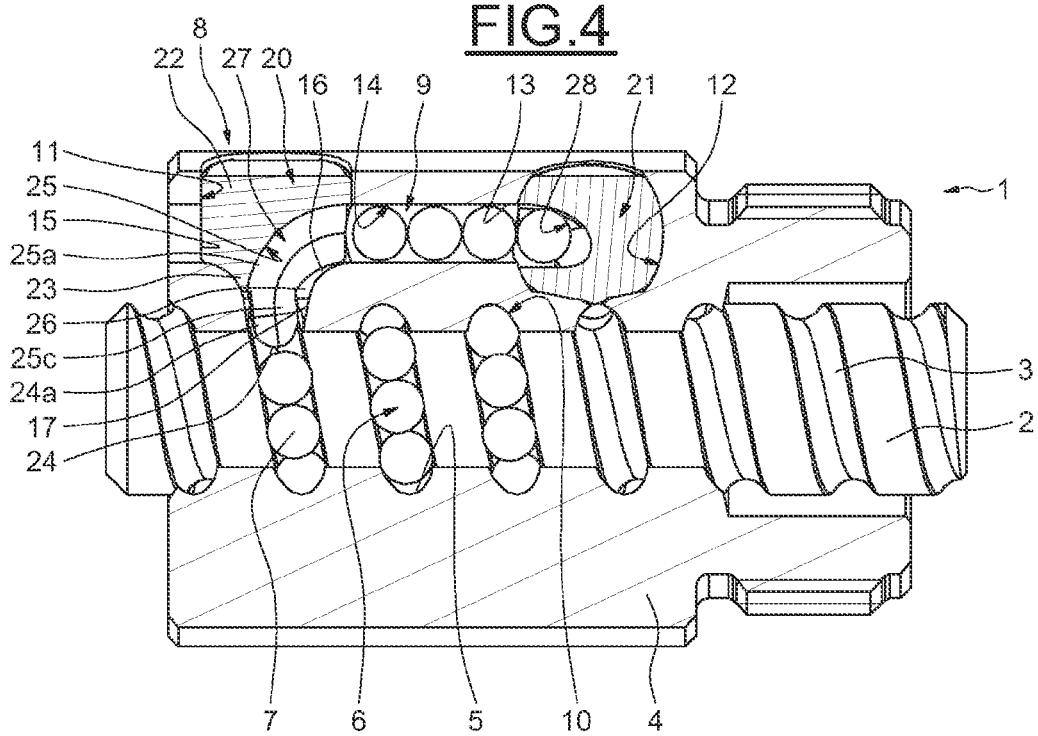
FIG. 4 is a longitudinal section corresponding to FIG. 3, without balls in the deflecting element.

As more particularly illustrated on FIGS. 3, 4 et 6, the annular edges 19 common to the cylindrical surfaces 15 and the toroidal surfaces 16 are, respectively, located at the inner generatrice of the longitudinal main hole 13 in the planes P1 and P2, such that the ends of the longitudinal main hole 13 are formed in the respective cylindrical surfaces 15 of the secondary holes 11 and 12 and the generatrice of the respective toroidal surfaces 16 contained in the respective planes P1 and P2 are joined tangentially to the inner generatrice of the longitudinal main hole 13. Furthermore, the respective inner openings 18 of the secondary holes 11 and 12 are located substantially at the ends of the circulating path 14.

The secondary holes 11 and 12 can be obtained by using a boring tool (not shown) having a profile corresponding to the cylindrical surface 15, the toroidal surface 16 and the tronconic surface 17.

Figure 5:
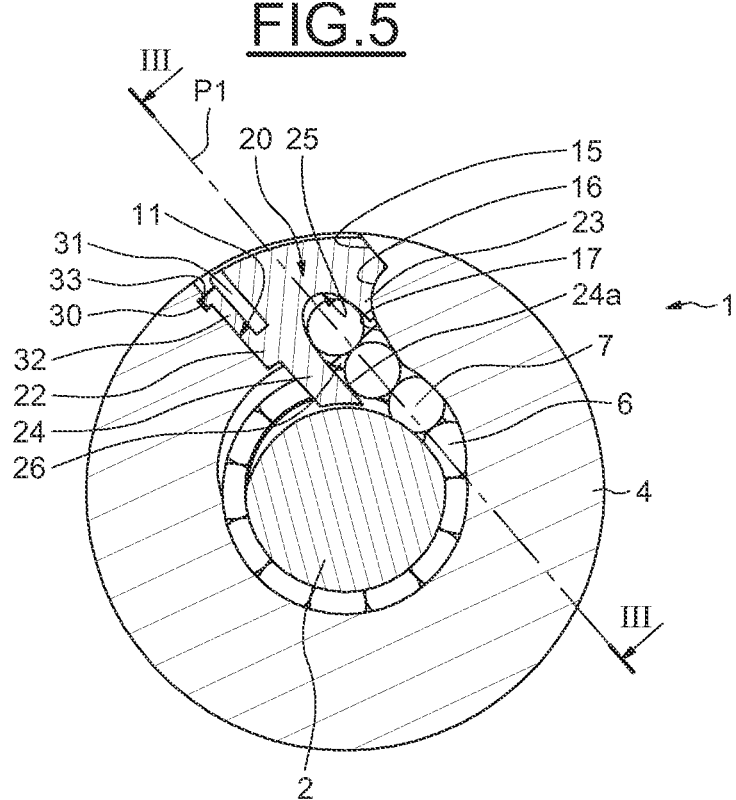
FIG. 5 is a cross section of the assembly, containing the axis of a deflecting element, with the balls.

As more particularly illustrated on FIGS. 3, 4 and 5, stepped deflecting elements 20 and 21, formed as one-piece units, are engaged respectively in the secondary holes 11 and 12. The deflecting elements 20 and 21 present lateral profiles which correspond to the walls of the secondary holes 11 and 12 and, in this way, comprise respectively a cylindrical portion 22 beared to the cylindrical surface 18 and a concave toroidal portion 23 beared to the convex toroidal surface 19. For example, the deflecting element 20 is illustrated in FIGS. 7 to 9.

The deflecting elements 20 and 21 comprise further respective pick-up and release lugs 24 which tranverse the respective inner openings 18 of the secondary holes 11 and 12 of the nut 4 and extend into the space between the thread 3 of the screw 2 and the thread 5 of the nut 4, at a distance of the thread 3 of the screw 2, without touch the latter. The respective lugs 24 of the deflecting elements 20 and 21 prolong one side of the toroidal portions 23 and determine substantially the ends of the circulating path 14, the lugs 24 facing the ends of the circonferencial circulating path 14.

The deflecting elements 20 and 21 are provided with respective guiding grooves 25 which are formed in order to face respective guiding local zones 26 of the toroidal surfaces 16 and the conical surfaces 17 of the secondary holes 11 and 12, such that the local zones 26 and surfaces of the grooves 25 define respective deflecting channels 27 and 28 which, on one hand, communicate with the corresponding ends of the longitudinal main hole 13 defining the return channel 14 and on the other hand communicate with corresponding spaces between the thread 3 of the screw 2 and the thread 5 of the nut 4, through the part of the respective inner openings 18 adjacent to the respective lugs 24 and substantially at the ends of the circulating path 14. The grooves 25 and the local zones 26 define opposed lateral parts of the respective deflecting channels 27 and 28, all along these deflecting channels.

The deflecting channels 27 and 28 are formed in order to have a section slightly superior to the diameter of the balls 7.

The grooves 25 of the deflecting elements 20 and 21, which are symmetrical with respect to said respective planes P1 and P2, comprise respectively a bottom part 25*a*, which have a half-circular section and are curved in order to form portions of toroidal surfaces, and opposed and parallel faces 25*b* and 25*c* joined tangentially to the bottom part 25*a* and abutting the said surfaces of the secondary holes 11 and 12.

As more particularly illustrated on FIGS. 3 and 4, the curvature of the bottom parts 25*a* follow at a distance the curvature of the section of the respective toroidal surfaces 16 of the secondary holes 11 and 12, substantially. The respective bottom parts 25*a* are joined tangentially to the corresponding end edges of the longitudinal main hole 13.

The respective lugs 24 of the deflecting elements 20 and 21 present respective surfaces 24*a* which prolong the surfaces of the surfaces of the grooves 25 and which are substantially tangential to the bottoms of the thread 3 of the screw 2 at the respective ends of the circulating path 10.

The deflecting elements 20 and 21 are positioned in the respective holes 11 and 12 of the nut 4, along and around the axis of the holes 11 and 12, by the fact that the concave toroidal portions 23 of the deflecting elements 20 and 21 abut on the convex toroidal surfaces 16 of the holes 11 and 12, from the outside to the inside of the nut 4, and that the sections of the lugs 24 of the deflecting elements 20 and 21 are adjusted to non-circular sections of the secondary holes 11 and 12, in order to form angular indexing means of the deflecting elements 20 and 21 inner to the respective holes 11 and 12 of the nut 4.

Figure 10:
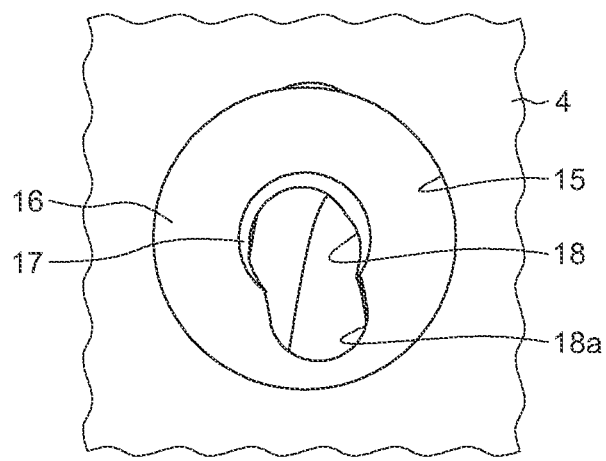
FIG. 10 is an external view of a hole receiving a deflecting element.

As illustrated more particularly on FIGS. 6 and 10, these non-circular sections can result of recesses 18*a* which are formed in the lateral inner parts of the secondary holes 11 and 12, containing the surfaces 16 and 17, and in which the parts of the lugs 24, opposed to the surfaces 24*a* of these lugs 24, are engaged. These recesses 18*a*, which form lateral extensions of the inner opening 18, are made after making the secondary holes 11 and 12 as described previously.

It results that the return channel 14 and the deflecting channels 16 and 17, connecting the ends of the return channel 14 to the respective ends of the circulating path 10, constitute the recirculating channel 9 which is used as following when the screw 2 and the nut 4 rotate with respect each other.

At one end of the circulating path 10, the balls 7 meet the surface 24*a* of the lug 24 of one deflecting element 20 or 21, substantially tangentially, and are picked-up or extracted from the circulating path 10. The balls 7 are deviated toward the corresponding deflecting channels 27 or 28. After that, the balls 9 run along this deflecting channel, enter tangentially in the return channel 14, run along this return channel 14, enter tangentially in the other deflecting channel 28 or 27, run along this other deflecting channel 28 or 27 and are released or reintroduced tangentially in the other end of the circulating path 10 by the lug 24 of the other deflecting elements 21 or 20.

The respective outer surfaces 29 of the deflecting elements 20 and 21 can be curved in order to follow the outer surface of the nut 4.

As more particularly illustrated in FIG. 5, the cylindrical parts 15 of the secondary holes 11 and 12 can present respective cavities 30 and the cylindrical portion 22 of the deflecting elements 20 and 21 can have respective slots 31 determining respective flexible legs 32 having respective radial projections 33 able to be introduced in the cavities 29 against the elasticity of the legs 32. According to variants of realisation, the deflecting elements 20 and 21 could be affixed on the nut 4 by the intermediate of screws or glue. FIG. 7 illustrates glue 50 on a deflecting element which can be used to secure the deflecting element in its respective hole.

The deflecting elements 20 and 21 can be made of metal or, advantageously, of easily mouldable synthetic material.

According to another embodiment, the return channel could be provided on the outer surface of the nut and formed in a cap.

Figure 11:
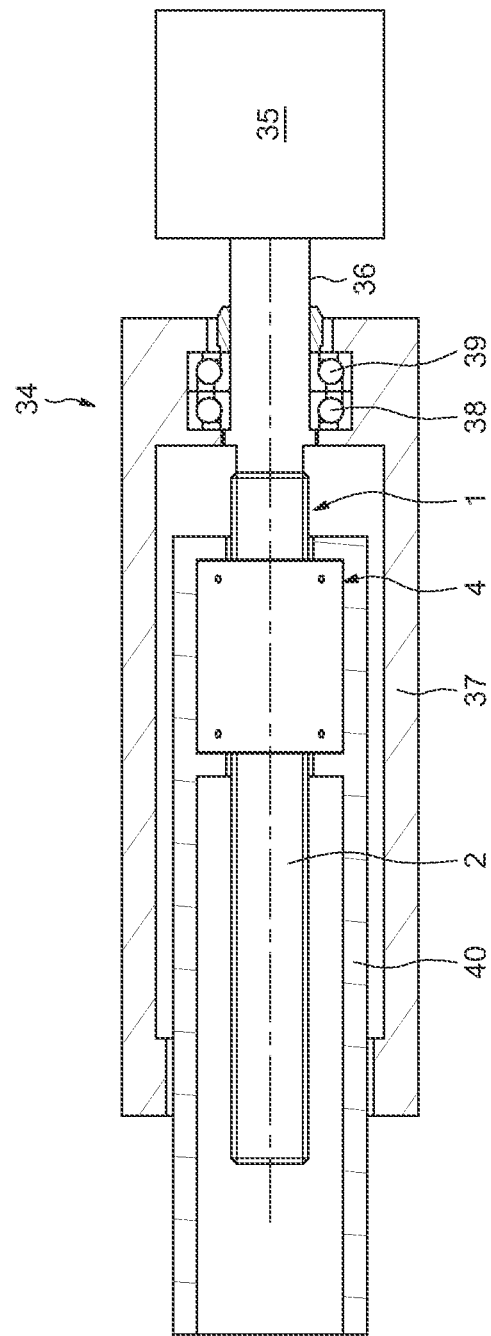
FIG. 11 is an axial section of a linear actuator according to an example of the invention.

Referring to FIG. 11, it will be described a specific application of the ball screw assembly 1 into a linear actuator 34.

The actuator 34 comprises a driving motor 35 having an output shaft 36 connected by suitable means (not shown) to the screw 2 of the assembly 1. The shaft 36 and the screw 2 are mounted into a housing 37 of the actuator by means of rolling bearings 38, 39, the nut 4 of the assembly carrying a tubular sleeve 40 which may be used to displace loads. When the motor 35 is activated, the shaft 36 and the screw 2 rotate and the sleeve 40 translates with respect to the screw 2.

The invention claimed is:

1. A ball screw assembly comprising:
   a screw provided with an outer thread;
   a nut provided with an inner thread;
   a series of balls able to circulate along a single circulating path between the screw and the nut, along which the balls are engaged in the threads thereof; and
   recirculating means defining a single recirculating channel to carry balls from one end to the other end of said circulating path; wherein
   the single recirculating channel comprises a return channel provided on the nut and between the ends of this return channel and the corresponding ends of said circulating path,
   deflecting channels which are defined by surfaces of deflecting elements engaged in respective holes of the nut and defined by local zones of surfaces of these respective holes; and wherein
   the holes each comprise only a single opening in an outer radial surface of the nut, and wherein
   the axis of the holes, which receive the deflecting elements, are placed in planes which are symmetrical with respect to a plane containing the axis of the nut and wherein
   the deflecting elements are of one-piece units, arranged about the outer circumference of the nut, and comprise respective pick-up and release lugs engaged between the threads of the screw and the nut, wherein the outer thread is configured such that the single circulating path includes all of the outer threads along the screw between the deflecting elements, and wherein
   the deflecting elements being configured such that insertion into the nut must be via the outer radial surface thereof, the deflecting elements having a shape such that insertion of the deflecting elements into the nut can only be accomplished if the deflecting elements are properly indexed during insertion into the nut, the deflecting elements engaging the nut via at least one of the group of an interference fit and a snap fit between the nut and the deflection elements, wherein
   the holes of the nut receiving the deflecting elements have at least respective convex toroidal surfaces comprising said local zones.

2. The assembly according to claim 1, wherein said surfaces of the deflecting elements and said local zones of surfaces of the holes are connected to the return channel tangentially.

3. The assembly according to claim 1, wherein the return channel further comprises a main hole which extends parallel to the axis of the nut, the plane of symmetry of the holes, which receive the deflecting elements, containing the axis of the main hole.

4. The assembly according to claim 1, wherein the deflecting elements further comprise respective grooves forming said surfaces thereof.

5. The assembly according to claim 4, wherein the grooves of the deflecting elements comprise curved half-circular bottom surfaces and opposed and parallel surfaces, the curved half-circular bottom surfaces facing said local zones of surfaces of the holes of the nut.

6. The assembly according to claim 1, wherein the deflecting elements have profiles corresponding to the profiles of the respective holes of the nut.

7. The assembly according to claim 1, further comprising angular indexing means of the deflecting elements in the respective holes of the nut.

8. The assembly according to claim 7, wherein the indexing means comprise recesses in the holes and parts of the lugs of the deflecting elements engaged in the recesses.

9. The assembly according to claim 1, further comprising means for fixing the deflecting elements in the respective holes of the nut.

10. The assembly according to claim 9, wherein the fixing means comprise parts of the nut and the deflecting elements engaging each other.

11. The assembly according to claim 10, wherein said parts of the nut are cavities formed in the holes thereof and said parts of the deflecting element are flexible legs having projections engaged in said respective cavities.

12. The assembly according to claim 9, wherein the fixing means comprises glue.

13. The assembly according to claim 1, wherein the return channel further comprises a hole extending longitudinally into the nut.

14. A ball screw assembly comprising:
a screw provided with an outer thread;
a nut provided with an inner thread;
a series of balls able to circulate along a circulating path between the screw and the nut, along which the balls are engaged in the threads thereof; and
recirculating means defining a recirculating channel to carry balls from one end to the other end of said circulating path; wherein
the recirculating channel comprises a return channel provided on the nut and between the ends of this return channel and the corresponding ends of said circulating path,
deflecting channels which are defined by surfaces of deflecting elements engaged in respective holes of the nut and defined by local zones of surfaces of these respective holes; and wherein
the axis of the holes, which receive the deflecting elements, are placed in planes which are symmetrical with respect to a plane containing the axis of the nut; and wherein
the deflecting elements are of one-piece units and comprise respective pick-up and release lugs engaged between the threads of the screw and the nut, wherein the holes of the nut receiving the deflecting elements have successively, from the outside to the inside of the nut, cylindrical surfaces, respective convex toroidal surfaces and conical surfaces, the convex toroidal surfaces and the conical surfaces defining said local zones.

15. A ball screw assembly comprising:
a screw provided with an outer thread;
a nut provided with an inner thread;
a series of balls able to circulate along a single circulating path between the screw and the nut, along which the balls are engaged in the threads thereof; and
recirculating means defining a single recirculating channel to carry balls from one end to the other end of said circulating path; wherein
the single recirculating channel comprises a return channel provided on the nut and between the ends of this return channel and the corresponding ends of said circulating path,
deflecting channels which are defined by surfaces of deflecting elements engaged in respective holes of the nut and defined by local zones of surfaces of these respective holes; and wherein
the holes each comprise only a single opening in an outer radial surface of the nut, and wherein
the axis of the holes, which receive the deflecting elements, are placed in planes which are symmetrical with respect to a plane containing the axis of the nut and wherein
the deflecting elements are of one-piece units, arranged about the outer circumference of the nut, and comprise respective pick-up and release lugs engaged between the threads of the screw and the nut, wherein the outer thread is configured such that the single circulating path includes all of the outer threads along the screw between the deflecting elements, and wherein
the deflecting elements being configured such that insertion into the nut must be via the outer radial surface thereof, the deflecting elements having a shape such that insertion of the deflecting elements into the nut can only be accomplished if the deflecting elements are properly indexed during insertion into the nut, the deflecting elements engaging the nut via at least one of the group of an interference fit and a snap fit between the nut and the deflection elements, wherein
the holes of the nut receiving the deflecting elements have successively, from the outside to the inside of the nut, cylindrical surfaces, respective convex toroidal surfaces and conical surfaces, the convex toroidal surfaces and the conical surfaces defining said local zones.

* * * * *